United States Patent Office.

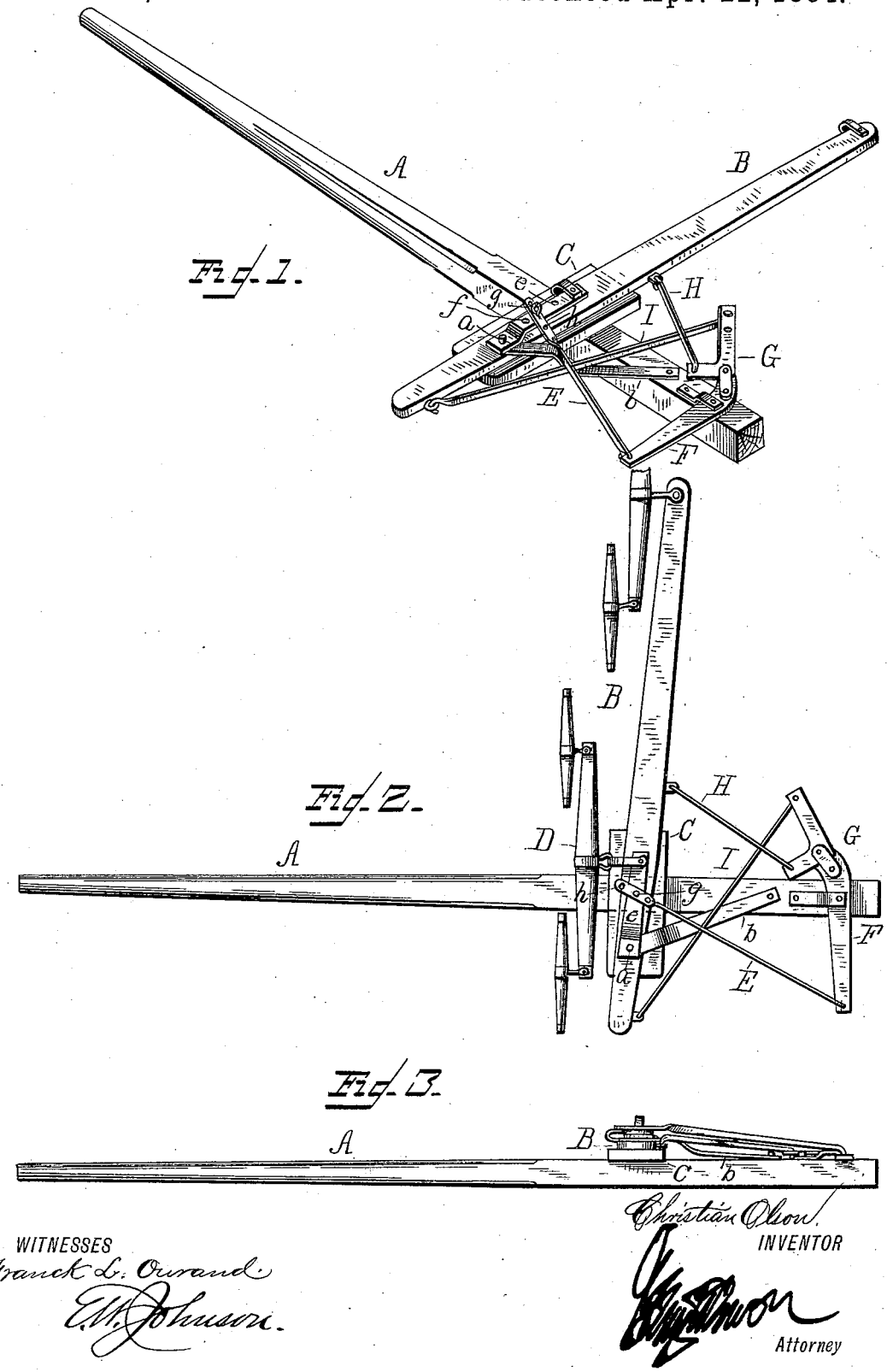

CHRISTIAN OLSON, OF GRANITE FALLS, MINNESOTA.

DRAFT-EQUALIZER.

SPECIFICATION forming part of Letters Patent No. 297,286, dated April 22, 1884.

Application filed January 31, 1884. (No model.)

*To all whom it may concern:*

Be it known that I, CHRISTIAN OLSON, a citizen of the United States of America, residing at Granite Falls, in the county of Yellow Medicine and State of Minnesota, have invented certain new and useful Improvements in Draft-Equalizers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention has reference to devices designed for equalizing the draft required for pulling vehicles of various kinds; and the said invention consists in the improvements described hereinafter, whereby the draft is borne by the horses out of draft-line proportionate with those in direct line.

In the accompanying drawings, forming part of this specification, Figure 1 is a perspective view of a structure embodying my improvements. Fig. 2 is a plan view, and Fig. 3 is a side view, of the same.

A is the draft-tongue, and B a bar pivoted at one end of a block, C, secured on the draft-tongue A, as shown in Figs. 1 and 2. The bolt $a$, which pivotally secures the bar B upon the block C, is also the medium of retaining one end of a brace-rod, $b$, the other end of which is secured to the draft-tongue A at the rear of the block C. The bolt $a$ also acts as a pivot for a bar, $e$, one end of which is perforated for the passage of the said bolt. The said bar $e$ is bent up, as shown in Figs. 1 and 2, so as to be free to oscillate above the bar B in oscillating upon its pivot $a$. The bar $e$ has a doubletree, D, attached to its free end, the said connection being directly or nearly in line with the central draft. The bar $e$ is also provided with a series of perforations, $f$, with one of which engages a bolt, $g$, which also passes through one of a series of perforations, $h$, in the end of a connecting-rod, E, the other end of which is secured to one end of a bar, F, centrally pivoted on the rear end of the draft-tongue, as shown in Figs. 1 and 2. To the other end of the rod F is pivoted, at its elbow, a bell-crank lever, G.

To the end of the bell-crank lever G nearest the tongue is secured one end of a connecting-rod, H, the other end of which is attached at or about the center of the bar B. The other end of the bell-crank lever G is provided with a series of perforations, $i$, with one of which engages the hooked end of a connecting-rod, I, the other end of which is connected to the extremity of the bar B nearest the draft-tongue.

From the foregoing it will be apparent that the traction of the central draft-pull on the bar $e$, by reason of the intermediate lever-connections described, throws the end of the bar B farthest from the draft-tongue A, so that the animal pulling at that point is compelled to exert a certain amount of traction to prevent himself from being pulled back.

By varying the connection of the rod E with the plate $e$ by changing the bolt $g$ from one perforation $f$ to another, and by effecting the same change of adjustment with the bent end of the bar I in the openings $i$ of the bell-crank lever G, the leverage of the several parts may be increased and decreased.

The bars H and I are preferably spring-leaves, so that they can readily move and yield under the various movements of the device.

I claim—

1. The combination, in a draft-equalizer, of a bar suitably pivoted and designed to receive the whiffletrees, and intermediate devices, adjustable as described, substantially as and for the purpose set forth.

2. The combination, in a draft-equalizer, of a bar suitably pivoted and designed to receive the whiffletrees, intermediate devices, adjustable as described, and containing the flexible rods E I, substantially as set forth.

In testimony whereof I affix my signature in presence of two witnesses.

CHRISTIAN OLSON.

Witnesses:
CHARLES E. SHANNON,
D. A. McLARTY.